United States Patent
Pettit et al.

(10) Patent No.: US 7,291,411 B2
(45) Date of Patent: Nov. 6, 2007

(54) FUEL CELL SHUTDOWN AND STARTUP PURGE USING A STOICHIOMETRIC STAGED COMBUSTOR

(75) Inventors: William Henry Pettit, Rochester, NY (US); Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 776 days.

(21) Appl. No.: 10/739,463

(22) Filed: Dec. 18, 2003

(65) Prior Publication Data

US 2005/0136304 A1    Jun. 23, 2005

(51) Int. Cl.
*H01M 8/04*    (2006.01)
(52) U.S. Cl. .............. 429/13; 429/22; 429/34
(58) Field of Classification Search ........... 429/13, 429/22, 34
See application file for complete search history.

(56) References Cited

U.S. PATENT DOCUMENTS

| | | | |
|---|---|---|---|
| 6,514,635 B2 | 2/2003 | Van Dine et al. ............. 429/17 |
| 6,645,650 B2 * | 11/2003 | Meyer et al. ................. 429/13 |
| 6,939,633 B2 * | 9/2005 | Goebel ........................ 429/17 |
| 2002/0076582 A1 | 6/2002 | Reiser et al. |
| 2002/0076583 A1 | 6/2002 | Reiser et al. |
| 2002/0098393 A1 | 7/2002 | Dine et al. |
| 2002/0102443 A1 | 8/2002 | Yang et al. |
| 2003/0148154 A1 * | 8/2003 | Kawasumi et al. ........... 429/20 |
| 2004/0146761 A1 * | 7/2004 | Cargnelli et al. ............. 429/22 |

FOREIGN PATENT DOCUMENTS

JP    2004-022487    *    1/2004

* cited by examiner

*Primary Examiner*—Mark Ruthkosky (57) ABSTRACT

A device and method for operating a fuel cell system. The device includes a combustor that is configured to combine reactants used in the fuel cell in such a way as to produce an inert fluid used to inert electrodes within the fuel cell. The device also includes componentry to permit purging of the electrodes subsequent to their inerting. In one form, the combustor is of such thermal mass that heat generated by combustion of the reactants is substantially absorbed by the combustor such that recourse to supplemental cooling apparatus is not required. The combustor may also be configured to promote staged mixing and subsequent reaction of the fuel cell reactants to further limit excess heat generated by the reaction. While the device of the present invention is usable during any period of system operation, it is especially valuable for operational conditions associated with starting up and shutting down a fuel cell system to inhibit the formation of high voltage potentials that could otherwise damage fuel cell catalysts or catalyst supports.

33 Claims, 5 Drawing Sheets

FUEL CELL SHUTDOWN AND STARTUP PURGE USING A STOICHIOMETRIC STAGED COMBUSTOR

CROSS-REFERENCE TO RELATED APPLICATIONS

This application is related to commonly assigned U.S. patent application Ser. No. 10/664,329, filed Sep. 17, 2003 (hereinafter the '329 application), the entire disclosure of which is herein incorporated fully by reference.

BACKGROUND OF THE INVENTION

The present invention relates generally to operating a fuel cell system, and more particularly to starting up and shutting down a fuel cell in such a way as to minimize oxidation of catalyst support material while maintaining system simplicity.

BRIEF SUMMARY OF THE INVENTION

A fuel cell system and a method of operating the system in such a way as to avoid the detrimental effects of operational transients on system components is disclosed. The present device, as well as the methods of operating it, can be used to first reduce open circuit voltage, then purge fuel cell electrodes to avoid the formation of potentials that could corrode a catalyst or its support. The prompt and thorough removal of reactant species allows rapid fuel cell starting and shutdown. This minimizes the excess shutdown energy levels and concomitant excessive voltage potentials that would otherwise be generated as a result of the hydrogen-air interface formed one or both of the fuel cell electrodes.

In accordance with a first aspect of the present invention, a device including at least one fuel cell with a combustor is disclosed. The fuel cell includes an anode, cathode and membrane disposed between the anode and cathode. Anode and cathode flowpaths are used to couple their corresponding electrodes to a first reactant source and a second reactant source, respectively. Valves disposed in the device allow the combustor to be placed in selective fluid communication with both of the flowpaths. The combustor includes a reaction chamber configured to promote staged mixing of a first reactant coming from the fuel source and a second reactant coming from the oxygen source.

Optionally, the device includes a catalyst disposed on at least a portion of the reaction chamber. In addition, the reaction chamber can be configured such that the first and second reactants are introduced in counterflow relation to one another. Moreover, the reaction chamber can comprise a construction defined by a first reactant conduit and a second reactant conduit, where at least one of them defines an arrangement of axially-spaced apertures therein to promote the staged mixing of the reactants. By way of example, the conduit can be arranged in an annular (concentric) configuration. This staged, or gradual, introduction of the reactants allows the reaction to build up in a more controlled fashion, thereby reducing the thermal load on the flowpaths. In one optional form, the combustor is a catalytic combustor, although it will be appreciated that a combustor employing a traditional flame burner could also be used. The combustor is of such thermal mass that heat generated by a reaction between the reactants is substantially absorbed by the combustor. In the present context, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue. In conjunction with the disclosed combustor, this means that the combustor structure (which may be made from a high heat content material such as metal) acts as a heat sink to the excess heat generated by the reaction inside the combustor such that after absorption of the heat of reaction, there is only an insignificant amount of extra thermal content of the reaction product over that of its precursor reactants. This in turn keeps temperatures below that which might otherwise damage the fuel cell, and does so without requiring the cost and complexity of a supplemental heat exchanger or cooler. By way of example, the permissible temperature increase is up to twenty degrees Celsius. It will also be appreciated that the thermal mass associated with the combustor need not be integrally-formed within the combustor, and as such may be employed outside of the main combustor housing, such as in the form of metal weight (with or without cooling fins) downstream of the combustor (but still upstream of the fuel cell). It will be understood that, so long as the primary purpose of such a mass is to reduce the thermal content of the reaction product by virtue of the mass absorbing a significant portion of such thermal content, this variant of the thermal mass, even though not integrally-formed on the combustor, is within the purview of the present invention.

Additionally, a sensor may be placed downstream of the combustor and cooperative with a controller such that the controller is responsive to a signal sent from the sensor. By way of example, the sensor may be an oxygen sensor, and the signal it sends can give an indication to the controller that the reaction product is deviating from its ideal stoichiometric condition. Feedback mechanisms coupled to the controller allow it to maintain a substantially stoichiometric ratio between the reactants in the combustor. In the present context, the term stoichiometric refers to reactions wherein just enough of each of the reactants is present to complete the reaction. For example, if it is the stoichiometric removal of oxygen that is of interest, there should be enough oxygen and fuel (such as hydrogen) present such that the reaction product becomes substantially oxygen-depleted. The device may also include a pressure source (such as a compressor) coupled to the source of the second reactant to promote the flow of the second reactant. It will be appreciated that the device may also include a power conversion mechanism to take electricity generated by the fuel cell and convert it to motive power. In addition, the device may also include a vehicle configured to house the fuel cell, its ancillary equipment and the power conversion mechanism. The vehicle (which may be, for example, a car, truck, motorcycle, aircraft or watercraft) is movably responsive to the motive power generated in the power conversion mechanism. In one embodiment, the fuel cell is a proton exchange membrane fuel cell, where the first reactant is a hydrogen-rich fluid, and the second reactant is an oxygen-rich fluid. In the present context, the terms "hydrogen-rich" and "oxygen-rich" include those reactant materials that include a sufficient quantity of hydrogen and oxygen respectively to sustain the desired reactions required by the appropriate fuel cell component. Examples of fuels that are hydrogen-rich are methanol, hydrogen, methane and gasoline.

The arrangement of the combustor and valves may be varied, depending on, among other things, whether the combustor feeds the anode or the cathode. By way of example, the device can be configured first with a stoichiometric combustor feeding the anode, second with a stoichiometric combustor feeding the cathode with an inert fluid purge for the anode, or third with a stoichiometric combustor feeding the cathode with reactant fluid purge for the anode, all as will be discussed in more detail below. Thus, optionally, the plurality of valves include an inerting valve configured to selectively introduce one of the first or second reactants into the combustor and a run valve configured to selectively introduce the first reactant into at least one of the combustor or the anode. In the first form of this option, the combustor is disposed in the anode flowpath, the inerting valve is fluidly disposed between the second reactant source and the combustor, and the run valve is fluidly disposed in the anode flowpath between the first reactant source and the combustor. In the second and third forms of this option, the combustor is disposed in the cathode flowpath, the inerting valve is fluidly disposed between the first reactant source and the combustor, and the run valve is fluidly disposed in the anode flowpath between the first reactant source and the anode. A purge valve can be included, situated between the anode flowpath and the cathode flowpath to allow selective fluid communication between them. In configurations (such as the second optional form) employing the purge valve, a cathode exit valve may also be included to selectively control back-pressure in a portion of the cathode flowpath that is downstream of the cathode. This can beneficial in helping force the fluid in the downstream (exhaust) portion of the fuel cell into the anode. In configurations (such as the third optional form), the purge valve may be placed fluidly upstream of the combustor in the cathode flowpath and fluidly downstream of the run valve. This can be beneficial in helping force an unmixed reactant (for example, air) in the upstream portion of the fuel cell into the anode for purging.

According to yet another aspect of the invention, an energy-producing device including a fuel cell with associated anode and cathode flowpaths and valving is disclosed. As with the previous aspect, the combustor is in selective fluid communication with both of the flowpaths, and configured to form a reaction product from first and second reactants. In this aspect, the combustor is possessive of such thermal mass that heat generated by a reaction between the first and second reactants is substantially absorbed by the combustor, thereby keeping temperature increases associated with the reaction below a predetermined amount. As previously discussed, the thermal mass can either form an integral part of the combustor (in the form of, for example, thicker combustor components or heat-absorbing appendages) or can be situated between the combustor and the fuel cell to reduce the thermal impact of the former on the latter. By providing the combustor with the integral or downstream extra thermal mass, the use of separate heat exchange devices is avoided.

According to another aspect of the invention, an energy-producing device is disclosed. As with the previous aspects, the device includes at least one fuel cell comprising an anode, cathode, membrane disposed therebetween, anode and cathode flowpaths and a combustor. In this aspect, the cathode flowpath fluidly couples the cathode to a pressurizable air source. In addition, the combustor is catalytic and in selective fluid communication with both of the flowpaths. As previously discussed, the combustor is possessive of such thermal mass that heat generated by a reaction therein is substantially absorbed by the combustor. The construction of the combustor is similar to that of the previously-described aspect, as is the configuration of the numerous valves used to establish the selective fluid communication between the combustor and at least one of the flowpaths.

Also as previously discussed, a sensor is disposed downstream of the combustor, and is signally coupled to a controller such that signals generated in the sensor can be used by the controller (as part of a feedback system) to maintain a substantially stoichiometric ratio between the reactants in the combustor.

According to another aspect of the invention, a method of purging a fuel cell system is disclosed. The method includes the steps of configuring the system to include at least one fuel cell, combustor and arrangement of valves similar to that discussed in at least one of the previous aspects. Additional steps include adjusting at least one of the valves to obtain a substantially stoichiometric mixture of the reactants in the combustor, reacting the mixture such that a substantially inert fluid is produced that can be subsequently introduced into at least one of the anode or cathode, and adjusting at least one of the valves to stabilize the system.

Optional steps include configuring the combustor to have such thermal mass that heat generated by the reacting step is substantially absorbed by the combustor, thereby keeping temperature increases concomitant with the reacting step below a predetermined amount to avoid damaging the fuel cell. As previously described, this combustor configuration allows the fuel cell system to operate without resort to use of a supplemental heat exchanger. Also as before, the arrangement of the combustor and valves may take on numerous forms, including (but not limited to) the three optional forms shown and described herein. In addition, different steps and in different sequences can be adopted, depending on whether the fuel cell is being started up or shut down.

For shutdown of the first previously discussed optional form, the first of the adjusting steps includes opening the inerting valve. This causes the formation of the substantially inert fluid that in turn flows into the anode and effects a reduced voltage potential therein by substantially displacing the resident fluid (which could be, for example, either fuel or fuel and air with a fuel/air interface). Voltage levels that would indicate a substantial electrode inerting are preferably below 0.5 volts, and more preferably below 0.4 volts. The second of the adjusting steps includes closing the run valve once a desirable reduced voltage potential has been attained. In more detail, the stabilizing portion of the second adjusting step includes flowing the second reactant into the anode until the anode is substantially purged. One way such second reactant flow is stopped can be by turning off a pressure source, such as an air compressor. Additional steps after the reacting step are also possible. For example, the sensor, controller and ancillary feedback equipment can be used to determine whether the residual second reactant (for example, oxygen) is present in the substantially stoichiometric mixture, and whether adjustment of at least one of the valves is warranted to ensure that the substantially stoichiometric relationship in the combustor is maintained.

Other steps can be employed for startup of the first previously discussed optional form. These may include flowing the second reactant into the inerting valve prior to the first of the adjusting steps. One way such flow can be initiated is by running an optional compressor, such as an air compressor. Moreover, the second of the adjusting steps comprises closing the inerting valve after the anode has been inerted.

As previously discussed, in the second previously discussed optional form, the inerting valve can be fluidly disposed between the first reactant source and the combustor, while the run valve can be fluidly disposed in the anode flowpath between the first reactant source and the anode.

The valves may further include a purge valve situated between the anode and cathode flowpaths as previously discussed. For shutdown of this optional form, the first of the adjusting steps includes closing the run valve and opening the inerting valve. As before, this causes the formation of the substantially inert fluid that effects a reduced voltage potential (this time, however, in the cathode). The second of the adjusting steps includes opening the purge valve once the reduced voltage potential in the cathode has been achieved to allow the substantially inert fluid to flow through and purge the anode. In addition, the second of the adjusting steps includes closing the inerting valve to purge the anode and cathode with the second reactant, after which the second reactant can be stopped from flowing. A back-pressure valve may additionally be placed downstream of the purge valve. This valve can be closed prior to the step of closing the inerting valve to promote flow of fluid in the exhaust to the anode.

As with the first previously discussed optional form, the second optional form can also employ other steps to effect fuel cell startup. For example, the second reactant can be flowed (such as through the use of the aforementioned optional compressor) prior to the first of the adjusting steps. Moreover, after the first adjusting step but before the second adjusting step, the purge valve can be closed. In conjunction with closing the purge valve, a back-pressure valve placed downstream of the purge valve can be placed in an open position, after which the second of said adjusting steps is performed, wherein such step includes opening the run valve and closing said inerting valve. An alternate way to achieve system startup includes flowing enough of the substantially inert fluid flows through the anode prior to the step of closing the purge valve prior to the second adjusting step. This has the effect of substantially displacing any fluid that was previously resident in the anode. As with the first optional form, the sensor, controller and ancillary feedback equipment can be used to maintain the fluid produced in the combustor in a substantially inert condition.

Shutdown of the third optional form, wherein the plurality of valves further comprise a purge valve configured to selectively fluidly couple the flowpaths to one another upstream of the fuel cell, includes in the aforementioned first of the adjusting steps closing the run valve and opening the inerting valve (both in a manner similar to that used in the second optional form). Also, as with the second optional form, this causes the formation of the substantially inert fluid that effects a reduced voltage potential in the cathode. Here, the introducing step includes opening the purge valve once the reduced voltage potential has been attained. As with the other two optional forms, the voltage can be a predetermined level, such as 0.5 volts or below, and more preferably 0.4 volts or below. The opening of the purge valve allows the second reactant to purge the anode. In this situation, the second of the adjusting steps may include closing the inerting valve, after which the second reactant can be stopped from flowing.

Startup of the third optional form includes placing the purge valve in a closed position (if it is already open) and commencing flow of the second reactant, both prior to the first of the adjusting steps. The second of the adjusting steps includes opening the run valve and closing the inerting valve.

According to still another aspect of the invention, a method of purging a fuel cell system is disclosed. The method is similar to that previously discussed, except that the combustor is configured to include a thermal mass sufficient to absorb heat generated by a reaction process in the combustor. This keeps temperature increases resulting from the reaction below a predetermined amount. As previously indicated, the inert fluid that is produced by the reaction in the combustor is generally too hot to be fed directly into the fuel cell. The additional thermal mass of the combustor can be used during the relatively short fuel cell startup and shutdown periods to absorb excess heat produced during the reaction, which in turn can help bring the temperature of the inert fluid down and avoid damage to the fuel cell.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1A:
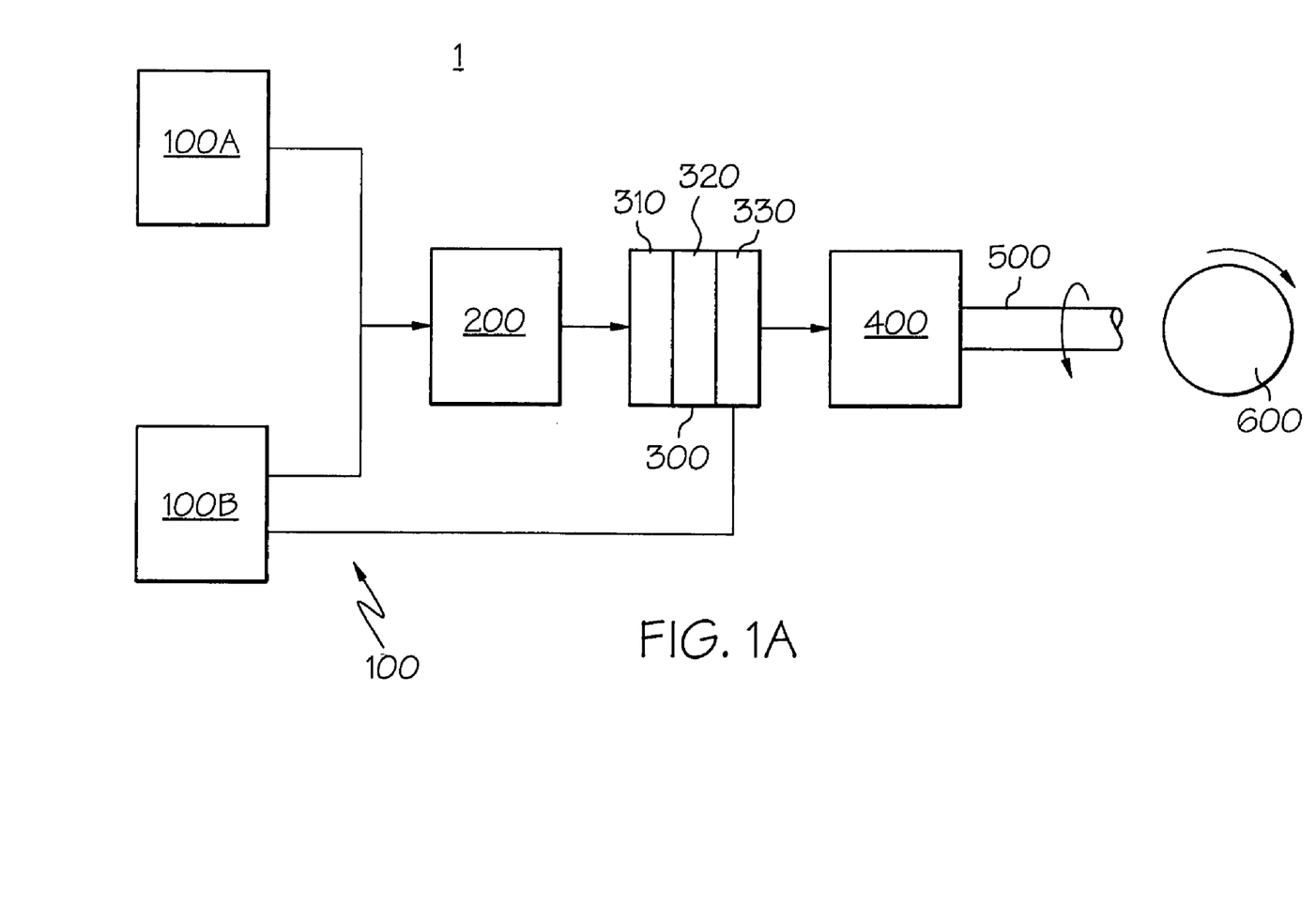
FIG. 1A shows a block diagram of a fuel cell system configured for vehicular application.

Referring initially to FIG. 1A, a block diagram highlights the major components of a mobile fuel cell system 1 according to the present invention. The system includes a fuel delivery system 100 (made up of fuel (i.e., first reactant) source 100A and oxygen (i.e., second reactant) source 100B), fuel processing system 200, fuel cell 300, one or more energy storage devices 400, a drivetrain 500 and one or more motive devices 600, shown notionally as a wheel. While the present system 1 is shown for mobile (such as vehicular) applications, it will be appreciated by those skilled in the art that the use of the fuel cell 300 and its ancillary equipment is equally applicable to stationary applications. It will also be appreciated by those skilled in the art that other fuel delivery and fuel processing systems are available. For example, there could be, in addition to a fuel source 100A and oxygen source 100B, a water source (not shown). Likewise, in some variants where substantially purified fuel is already available, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. The fuel processing system 200 may be incorporated to convert a raw fuel, such as methanol, into hydrogen or hydrogen-rich fuel for use in fuel cell 300. Fuel cell 300 includes electrodes, notably an anode 310 and cathode 330, and an electrolyte layer 320 disposed between the electrodes. Although only a single fuel cell 300 is shown, it will be appreciated by those skilled in the art that fuel cell system 1 (especially those for vehicular and related applications) may be made from a stack of such cells serially connected.

Figure 1B:
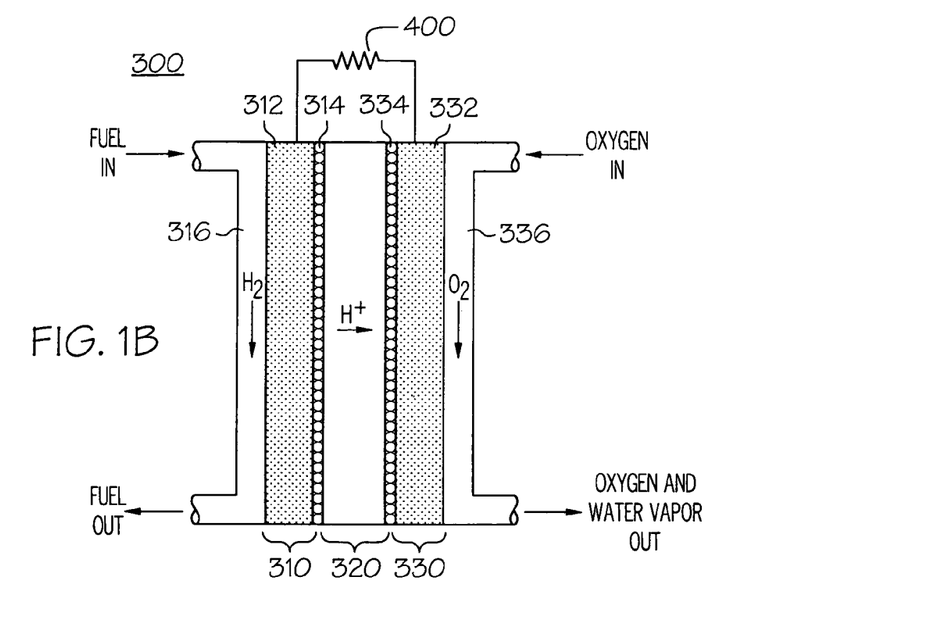
FIG. 1B shows a representative fuel cell from the system of FIG. 1A.
Figure 1C:
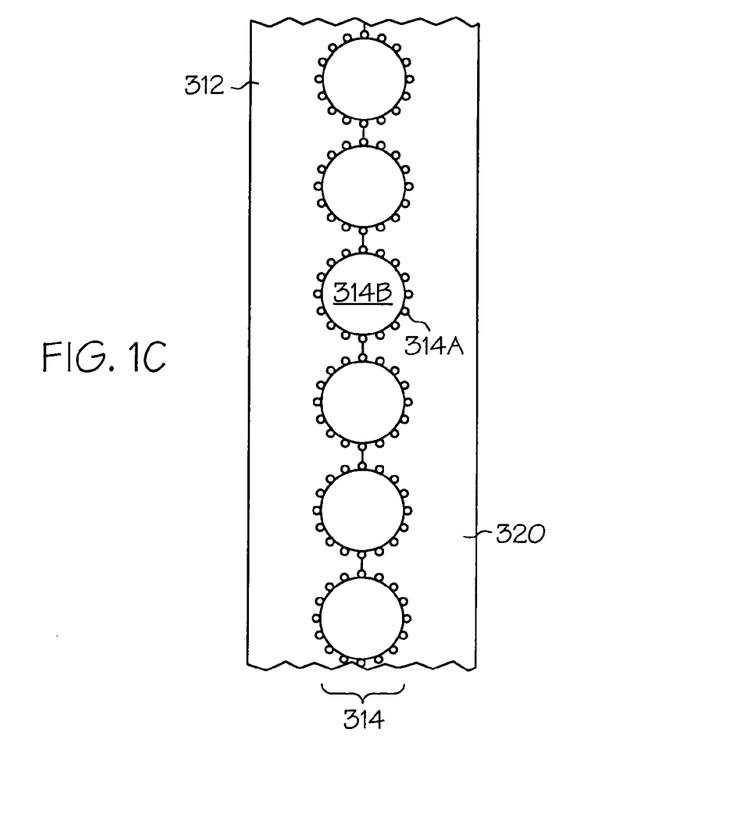
FIG. 1C shows an enlargement of the region between the anode and membrane of the fuel cell of FIG. 1B, highlighting the placement of a catalyst on a support, where the catalyst is used to facilitate the ionization of the fuel.

Referring next to FIGS. 1B and 1C, the anode 310 includes an electrode substrate 312 and catalyst layer 314 connected to a flow channel 316. The cathode 330 includes an electrode substrate 332 and catalyst layer 334 connected to a flow channel 336. Flow channels 316, 336 form the part of an anode flowpath and cathode flowpath (both described below) that contact their respective anode and cathode. Preferably, the electrode substrates 312, 332 are porous to allow diffusion of fuel and oxygen, as well as the flow of water that forms as a result of the fuel-oxygen reaction. The electrolyte layer 320, shown presently in the form of a proton exchange membrane, allows the ionized hydrogen to flow from the anode 310 to the cathode 330 while inhibiting the passage of electrical current therethrough. The catalyst layer 314 is made up of a catalyst 314A dispersed on the surface of a support 314B. Although not shown, it will be appreciated by those skilled in the art that the construction of the catalyst layer 334 for the cathode 330 may be substantially similar to that of the catalyst layer 314 depicted in FIG. 1C.

In operation, fuel (typically in the form of gaseous hydrogen) passes through flow channel 316, allowing the fuel to diffuse through electrode substrate 312 and come in contact with the catalyst 314A, through which the electrochemical oxidation of the hydrogen fuel proceeds by what is believed to be a dissociate adsorption reaction. This reaction is facilitated by catalyst 314A, typically in the form of finely-divided particles of a noble metal (such as platinum) that are dispersed over the surface of the support 314B, which is typically carbon-based. The positively-charged hydrogen ion (proton) produced at the anode 310 then passes through the electrolyte 320 to react with the negatively-charged oxygen ions generated at the cathode 330. The flow of liberated electrons sets up a current through the load in energy storage device 400 such that a motor or related current-responsive device may be turned. An additional pump (not shown) can be included to remove from the electrode substrates 312, 332 water that would otherwise collect and possibly block the porous passageways. During transient fuel cell operations, especially startup and shutdown, the presence of hydrogen-air interfaces, both along the flow channels 316, 336 and across the electrolyte 320, can lead to excess voltage potentials that can shorten the life of the catalyst layers 314, 334. In order to prevent or minimize the impact of an air-hydrogen interface, the system can be configured to inert and purge the cathode and anode of resident air or fuel such that these high voltage potentials are meliorated.

Figure 2A:
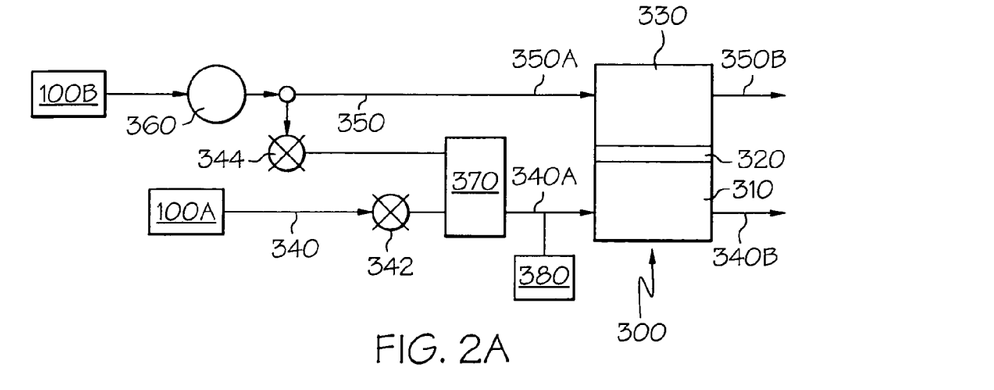
FIG. 2A shows a block diagram of a fuel cell system employing a stoichiometric combustor in an anode flowpath according to one embodiment of the present invention.
Figure 2B:
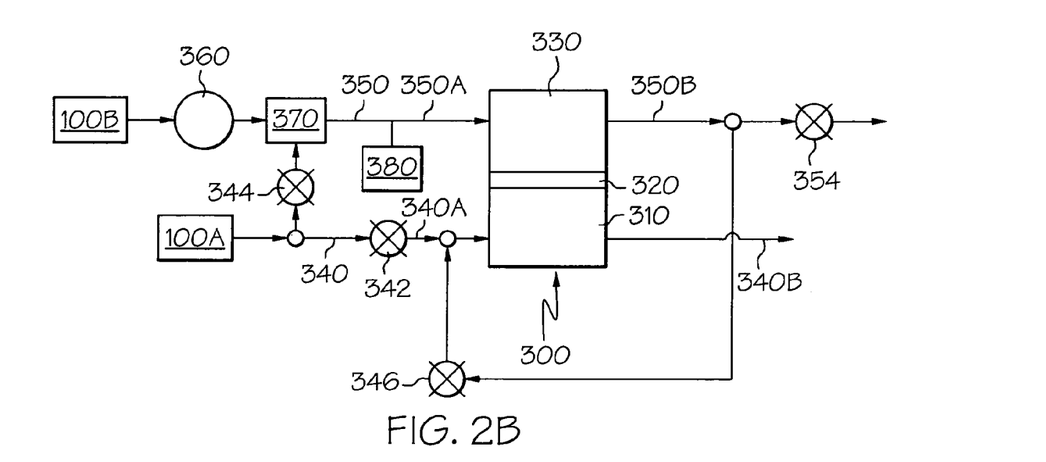
FIG. 2B shows a block diagram of a fuel cell system employing a stoichiometric combustor in a cathode flowpath with inert fluid purging of the anode according to another embodiment of the present invention.
Figure 2C:
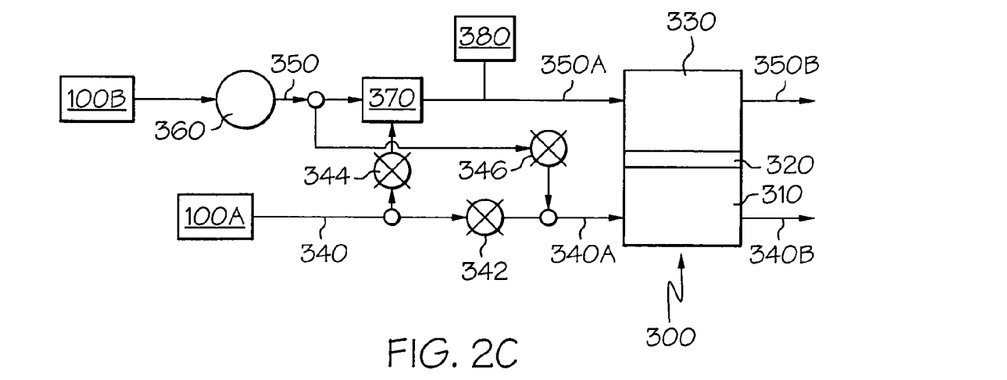
FIG. 2C shows a block diagram of a fuel cell system employing a stoichiometric combustor in a cathode flowpath with second reactant purging of the anode according to another embodiment of the present invention.

Referring next to FIGS. 2A through 2C, block diagrams of various embodiments of the present system are shown. Referring with particularity to FIG. 2A, a first system configuration is shown where combustor 370 is placed in anode flowpath 340, the latter of which fluidly couples fuel source 100A to the anode 310 through a run (i.e., fuel supply) valve 342. Flowpath 340 includes a portion 340A that is upstream of fuel cell 300, and a portion 340B that is downstream of it. Oxygen source 100B is fluidly coupled to the cathode flowpath 350 such that oxygen can be flowed past cathode 330. Much like anode flowpath 340, cathode flowpath 350 includes a portion 350A that is upstream of fuel cell 300, and a portion 350B that is downstream of it. A pressure source 360 (such as in the form of an air compressor) is placed in the upstream portion 350A of cathode flowpath 350 to promote the flow of oxygen from oxygen source 100B. Inerting valve 344 couples the upstream portion 350A of cathode flowpath 350 to anode flowpath 340 though combustor 370; in the present configuration, it functions as an air inert valve. Feedback mechanism 380 includes a sensor and controller. Sensor is preferably an oxygen sensor, and is used to detect the presence of residual amounts of the second reactant (for example, oxygen) in the otherwise substantially inert fluid that is produced in combustor 370. If an oxygen concentration above a predetermined threshold is detected by the sensor, it sends a signal to the controller to instruct it to change the settings in one or more of the valves in an attempt to maintain the desired stoichiometric ratio of reactants in combustor 370.

By the present construction, the substantially inert fluid (comprising, for example, mostly nitrogen and water vapor with traces of other gases) produced by the stoichiometric reaction of the hydrogen in the fuel and the oxygen in air leaves the combustor 370 and is delivered to the anode 310, where it displaces whatever fluid is currently resident therein. For example, during startup, anode 310 may initially be bathed in air, after which the air is displaced by the inert fluid. By contrast, during shutdown, hydrogen is displaced with the inert fluid to reduce the open circuit voltage, after which the inert fluid may subsequently be replaced with the second reactant that is permitted to flow from oxygen source 100B, and through inerting valve 344 and combustor 370.

The embodiment of FIG. 2A (and of the embodiments of FIGS. 2B and 2C, both described in more detail below) highlights how using inerting and purge fluids can be effective in reducing the open circuit voltage at the anode 310 and cathode 330. For example, the more inert the substantially inert fluid is, the higher the allowed open circuit voltage will be. Similarly, if the open circuit voltage were reduced to a low value, such as between 0 and 0.4 volts, through proper selection of an inerting fluid, a relatively non-inert fluid (such as air) could be subsequently introduced as the purge fluid, greatly simplifying the system. To get the open circuit voltage reduced to this level, the fluid introduced into the cathode 330 or anode 310 would be need to be fairly inert (i.e., possessing very low oxygen or hydrogen partial pressure). By operating the combustor 370 stoichiometrically, production of such an inert fluid can be efficiently effected. Accordingly, the inerting and purging functions can be combined as shown and described herein. In addition, a measurement of the voltage level could be used to determine if the gas present is substantially inert, and therefore safe to purge; such measurement could be used in conjunction with the aforementioned feedback mechanism 380.

Referring with particularity to FIG. 2B, a second system configuration is shown where combustor 370 is placed in cathode flowpath 350. In this configuration, unlike that of the previous embodiment of FIG. 2A, the inert fluid generated in combustor 370 is fed to cathode 330. The configuration of FIG. 2A that has the combustor 370 connecting to anode 310 is generally simpler in construction, while the configuration of the present figure may make it easier to reduce the voltage potential during transients by inerting, as the slower kinetics of the cathode 330 would permit the use of inert fluids that need not be quite as pure as those of the system of FIG. 2A. Inerting valve 344 couples the upstream portion 350A of cathode flowpath 350 to anode flowpath 340 though combustor 370; in the present configuration, it functions as a fuel inert valve. The present embodiment also includes an anode purge flowpath fluidly coupled to the downstream portion 350B of cathode flowpath 350, and includes a purge valve 346 that permits selective fluid coupling of the cathode exhaust to the upstream portion 340A of anode flowpath 340. The present configuration also includes a cathode back-pressure valve 354, which can be used to route cathode exhaust flow to purge valve 346, which if opened would permit the flow of fluid passing from cathode flowpath 350 into and through anode 310. By virtue of the interconnection between the flowpaths in this embodiment, the inert fluid produced by combustor 370 can be used to purge both the anode 310 and cathode 330. In addition, the present interconnection permits electrode purging during fuel cell 300 shutdown as well as startup. As with the previous optional form, in both the shutdown and startup modes of transient operation, the stoichiometric reaction of the present embodiment could also be adjusted through manipulation of the compressor 360 and consequent airflow. As such, the controller of feedback equipment 380 would be able to send appropriate control signals to the compressor 360 to maintain stoichiometry of the reaction product formed in combustor 370. It will be appreciated by those skilled in the art that this optional form can thus inert the cathode 330 then purge the anode 310 with the substantially inert fluid prior to flowing either a purging second reactant (such as air) for shutdown or a fuel (such as hydrogen) for startup.

Referring with particularity to FIG. 2C, a third system configuration is shown where combustor 370 is placed in cathode flowpath 350 in a manner somewhat similar to that of FIG. 2B. However, unlike the configuration of FIG. 2B, the present embodiment uses a reactant purge of the anode rather than an inert fluid purge; as such, it does not require the earlier-described back-pressure valve. In addition, purge valve 346 is relocated such that it connects cathode flowpath 350 upstream of combustor 370 to anode flowpath 340 downstream of run valve 342 but upstream of anode 310. In a preferred (but not necessarily required) form, the reactant is the oxygen contained in air. During fuel cell shutdown, once the cathode 330 has been inerted (as indicated by the aforementioned low cell voltage), the purge valve 346 is opened to allow second reactant to flow into anode 310, thereby purging it. Afterwards, the inert valve 344 can be closed, and compressor 360 may be shut off. During startup, purge valve 346 is closed (if not already), after which compressor 360 is started. As with the other embodiments, one or more of the valves could be adjusted to achieve the stoichiometric reaction in combustor 370. As with the previously-discussed optional forms, the stoichiometric reaction of the present embodiment could also be adjusted through manipulation of the compressor 360 and consequent airflow.

Figure 3:
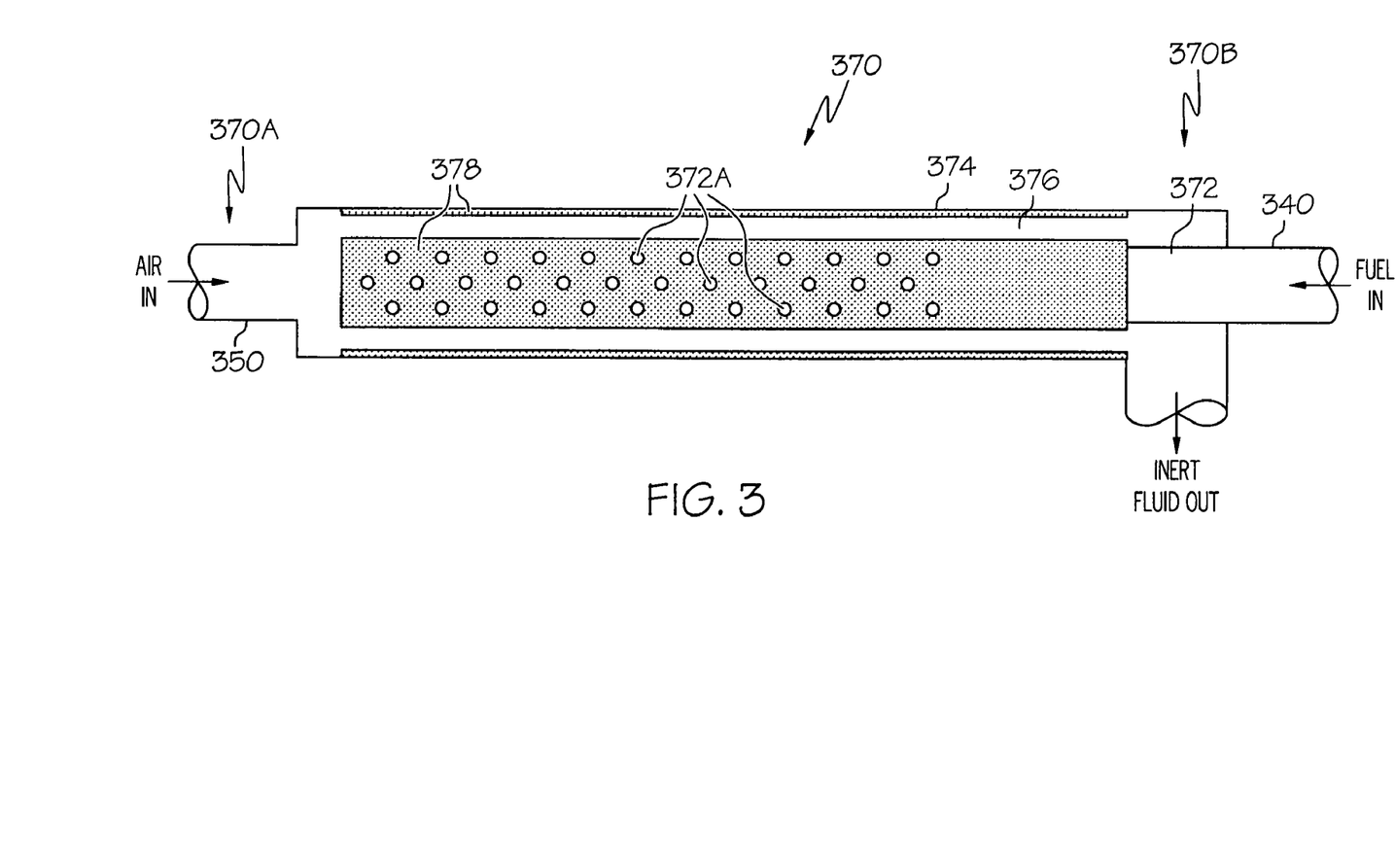
FIG. 3 shows details of a staged combustor that forms part of the fuel cell system of FIGS. 2A, 2B or 2C.

Referring next to FIG. 3 in conjunction with any one of FIGS. 2A through 2C, combustor 370 is preferably in the form of a staged annular combustor, and is placed in anode or cathode flowpaths 340, 350 upstream of fuel cell 300 so that a substantially inert fluid can be generated that is subsequently used to inert the cathode 330 or anode 310. The process enabled by combustor 370 can both speed up the transient operation of the system by more quickly displacing fuel and oxygen resident within the anode 310 and cathode 330, and enable simpler purging of the anode 310 or cathode 330 during such system transients. In a preferred embodiment, combustor 370 is made from a relatively dense material with significant ability to act as a heat sink. Metals are a class of material that possess such properties, as are ceramics. The ability of the combustor 370 to absorb heat can be enhanced by adding more mass, which can be achieved by making thicker-walled structures, or structure of longer physical dimensions. Heat-conductive appendages can also be added to the combustor 370 to improve the thermal mass. It will be appreciated that the location of the thermal mass of combustor 370 is not limited to being immediately adjacent the reactant mixing or combustion zones, or even within the housing of combustor 370. For example, the thermal mass could be located between combustor 370 and fuel cell 300 and still considered part of combustor 370, so long as its primary purpose is to reduce the thermal build-up associated with the reaction taking place in combustor 370.

By virtue of the relatively large thermal mass of combustor 370, heat generated therein during production of the inert fluid is substantially contained within the thermal mass, thereby reducing or eliminating outright the need for supplemental cooling devices, such as heat exchangers. For example, where the duration of the purge step is on the order of ten seconds or less, the thermal mass of the combustor 370 can be made such that no supplemental cooling device is required. The thermal mass of the combustor 370 could be made to cover longer purge durations by scaling the mass with the total volume of inert gas being generated. For example, about 250 grams of metal heat sink with a 20° C. temperature rise in combustor 370 would be needed for each liter of inert gas generated. For a given purge flow rate, a purge time would correspond to the needed purge volume, which would scale with the size of the fuel cell 300. Short times are desirable, especially in vehicular applications, where operators have become accustomed to quick startup and shutdown periods.

The annular configuration of combustor 370 includes an inner pipe 372 and an outer pipe 374 such that an annulus 376 is formed between them. A catalyst 378 (for example, in the form of a coating) is disposed along the walls of the inner and outer pipes 372, 374 that define the annulus 376. Combustor 370 is of substantially longitudinal construction with a first end 370A and a second end 370B, so defined to indicate that the flow of fluid into the combustor 370 proceeds in the directions shown, where second reactant (shown as air) enters from the first end 370A, while first reactant (shown as fuel) enters from the second end 370B such that, upon formation of the substantially inert fluid reaction product, it flows out as shown on its way to anode 310 or cathode 330, depending on the configuration of the system. The inner pipe 372 includes numerous small holes 372A to allow staged entry of first reactant such that the first reactant is axially introduced into second end 370B via inner pipe 372 until it passes through the holes 372A and into annulus 376 situated between the inner and outer pipes 372, 374. The second reactant is fed through first end 370A into annulus 376. The axial spacing of holes 372A promote a gradual (i.e., staged) mixing of the reactants in annulus 376 and subsequent catalytic reaction on catalyst 378. Holes 372A terminate appreciably upstream of the second end 370B of combustor 370 such that there is sufficient catalyst 378 in the downstream direction of a reactant mixing zone in annulus 376 to maximize the catalyzing reaction. The mixture created in annulus 376 diffuses to the catalyst coated walls where reaction between the reactants occurs. The energy from the reaction at catalyst 378 will heat the walls of combustor 370. In the present system, the thermal excesses arise during operational transients (notably startup and shutdown) in the fuel cell, where the reaction product from the combustor is used to inert and subsequently (and in some cases, simultaneously) purge at least one of the anode or cathode. While the reaction product forms the inerting fluid that bathes the region surrounding the carbon supports 314B, 334B and catalyst 314A, 334A of the anode 310 and cathode 330 to reduce voltage potentials, its elevated temperature (if left unchecked) could damage the anode 310, cathode 330 or membrane 320.

As discussed above, the thermal mass of the combustor 370 is adequate to absorb the heat of reaction over the duration of the purge cycle without significant temperature rise. In addition, the staged reaction allows for a more gradual build-up of the reaction heat, thereby reducing the likelihood of forming a localized hot spot that could otherwise harm combustor 370 components. It will be appreciated by those skilled in the art that while a counterflow orientation is notionally shown to provide a more uniform air delivery into the reacting region, a co-flow configuration could also be employed, where the first and second reactants could be introduced into the same general side of the combustor 370. It will be appreciated by those skilled in the art that the construction of combustor 370 and the input of the reactants to it can be operated as part of a continuous, ongoing combustion process, or as a discrete batch process, and that either approach is suitable to the embodiments of the present invention.

The size of the annulus 376 within the combustor 370 should be small enough to minimize the diffusion distance to the combustor walls, but of sufficient catalyst-coated surface area to support the reaction. By way of example, for a purge rate of 0.02 grams per second of hydrogen (which equates to about 2% of the full power fuel flow) along with a stoichiometric portion of air flow (0.687 grams per second), an annular combustor of 1.1 inch inner diameter, 1.4 inch outer diameter and 10 inches long would allow for adequate mass transfer to the catalyst coated walls of combustor 370. In this circumstance, an outer pipe 374 and inner pipe 372 wall thickness of 0.1 inch would provide the desired mass. At this purge rate, the purge time would be about four seconds, and would generate about four liters of inert gas. The size of the inner pipe 372 and annulus 376 would be selected to provide adequate flow area for full power fuel flow rates for the first system configuration of FIG. 2A or full power air flow rates for the second and third configurations of FIGS. 2B and 2C for normal operation. Of course, a longer combustor 370 or lower purge rates could be used to further ensure complete reaction and heat removal. Extended surfaces (ribs or fins for example) on the combustor wall could also be used to increase the reaction and heat transfer area.

Figure 4:
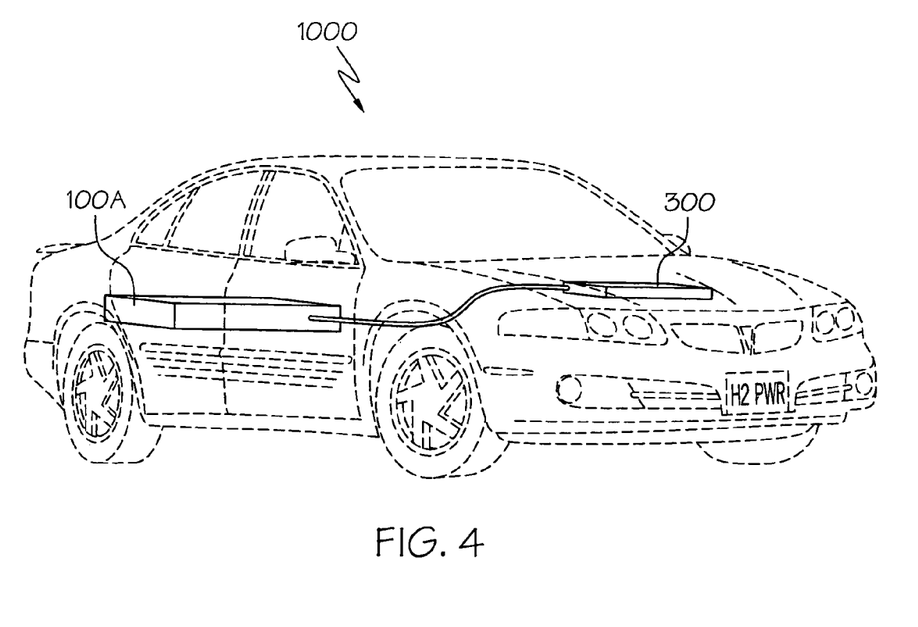
FIG. 4 shows a vehicle employing the fuel cell system of FIGS. 2A, 2B or 2C.

Referring next to FIG. 4 in conjunction with FIG. 1, a vehicle 1000 incorporating a fuel cell system according to the present invention is shown. Fuel cell 300 is fluidly coupled to a fuel supply 100A. While the vehicle 1000 is shown notionally as a car, it will be appreciated by those skilled in the art that the use of fuel cell systems in other vehicular forms (for example, a truck, motorcycle, aircraft, spacecraft or watercraft) is also within the scope of the present invention.

While certain representative embodiments and details have been shown for purposes of illustrating the invention, it will be apparent to those skilled in the art that various changes may be made without departing from the scope of the invention, which is defined in the appended claims.

What is claimed is:

1. A method of purging a fuel cell system, said method comprising:
   configuring said system to include:
      at least one fuel cell comprising an anode, a cathode and a membrane disposed between said anode and cathode;
      an anode flowpath configured to couple said anode to a source of a first reactant;
      a cathode flowpath configured to couple said cathode to a second reactant source;
      a combustor in selective fluid communication with both of said flowpaths, said combustor comprising a reaction chamber configured to promote staged mixing of said first reactant and said second reactant; and
      a plurality of valves, at least one of which is configured to establish said selective fluid communication between said combustor and at least one of said flowpaths, said plurality of valves comprising:
         an inerting valve configured to selectively introduce one of said first or second reactants into said combustor; and
         a run valve configured to selectively introduce said first reactant into at least one of said combustor or said anode;
   adjusting at least one of said inerting valve or said run valve to obtain a substantially stoichiometric mixture of said first and second reactants in said combustor;
   reacting said substantially stoichiometric mixture such that a substantially inert fluid is produced;
   introducing said substantially inert fluid into at least one of said anode or cathode such that any fluid previously resident therein is substantially displaced therefrom; and
   adjusting at least one of said inerting valve or said run valve to stabilize said system.

2. The method of claim 1, wherein said combustor is of such thermal mass that heat generated by said reacting is substantially absorbed by said combustor, thereby keeping temperature increases concomitant with said reacting below a predetermined amount.

3. The method of claim 2, wherein said inerting valve is fluidly disposed between said source of said second reactant and said combustor, and said run valve is fluidly disposed in said anode flowpath.

4. The method of claim 3, wherein the first of said adjusting steps comprises opening said inerting valve, thereby causing said introducing step to effect a reduced voltage potential in said anode, and the second of said adjusting steps comprises closing said run valve once said reduced voltage potential has been attained.

5. The method of claim 4, wherein said reduced voltage potential is up to 0.5 volts.

6. The method of claim 5, wherein said reduced voltage potential is up to 0.4 volts.

7. The method of claim 4, wherein said stabilizing comprises flowing said second reactant into said anode at least until said anode is substantially purged.

8. The method of claim 3, wherein said system further comprises a sensor disposed downstream of said combustor and a controller responsive to a signal sent from said sensor, said controller configured to maintain said substantially inert fluid in its substantially inert condition.

9. The method of claim 3, further comprising flowing said second reactant into said inerting valve prior to the first of said adjusting steps.

10. The method of claim 9, wherein the second of said adjusting steps comprises closing said inerting valve.

11. The method of claim 2, wherein said inerting valve is fluidly disposed between said source of said first reactant and said combustor, and said run valve is fluidly disposed in said anode flowpath.

12. The method of claim 11, wherein said plurality of valves further comprise a purge valve disposed downstream of said fuel cell in said cathode flowpath and fluidly coupled to said anode flowpath upstream of said fuel cell.

13. The method of claim 12, wherein said first adjusting step comprises closing said run valve and opening said inerting valve, thereby causing said introducing step to effect a reduced voltage potential in said cathode, and said introducing step comprises opening said purge valve once said reduced voltage potential has been attained to allow said substantially inert fluid to flow through said anode.

14. The method of claim 13, wherein said reduced voltage potential is up to 0.5 volts.

15. The method of claim 14, wherein said reduced voltage potential is up to 0.4 volts.

16. The method of claim 12, wherein said system further comprises a sensor disposed downstream of said combustor and a controller responsive to a signal sent from said sensor, said controller configured to maintain said substantially inert fluid in its substantially inert condition.

17. The method of claim 13, wherein the second of said adjusting steps comprises closing said inerting valve to purge at least one of said anode and cathode with said second reactant.

18. The method of claim 17, comprising the additional step of stopping said second reactant from flowing once said at least one of said anode and cathode have been purged.

19. The method of claim 17, further comprising:
disposing a back-pressure valve downstream of said purge valve; and
closing said back-pressure valve to promote flow of fluid from said cathode flowpath to said anode.

20. The method of claim 12, wherein the second of said adjusting steps comprises opening said run valve then closing said inerting valve, said method further comprising:
flowing said second reactant prior to the first of said adjusting steps; and
closing said purge valve prior to said second adjusting step.

21. The method of claim 20, wherein prior to said step of closing said purge valve prior to said second adjusting step, enough of said substantially inert fluid flows through said anode to substantially displace all fluid that was resident in said anode prior to said flowing of said substantially inert fluid.

22. The method of claim 20, further comprising:
disposing a back-pressure valve downstream of said purge valve in said cathode flowpath; and
placing said back-pressure valve in an open position prior to said second adjusting step.

23. The method of claim 11, wherein said plurality of valves further comprise a purge valve configured to selectively fluidly couple said cathode flowpath at a location upstream of said combustor to said anode flowpath at a location upstream of said fuel cell.

24. The method of claim 23, wherein said first adjusting step comprises closing said run valve and opening said inerting valve, thereby causing said introducing step to effect a reduced voltage potential in said cathode, and said introducing step comprises opening said purge valve once said reduced voltage potential has been attained to allow said second reactant to flow through said anode.

25. The method of claim 24, wherein said reduced voltage potential is up to 0.5 volts.

26. The method of claim 25, wherein said reduced voltage potential is up to 0.4 volts.

27. The method of claim 23, wherein said system further comprises a sensor disposed downstream of said combustor and a controller responsive to a signal sent from said sensor, said controller configured to maintain said substantially inert fluid in its substantially inert condition.

28. The method of claim 24, wherein the second of said adjusting steps comprises closing said inerting valve.

29. The method of claim 28, comprising the additional step of stopping said second reactant from flowing once said anode has been purged.

30. The method of claim 23, comprising the additional steps of:
placing said purge valve in a closed position prior to the first of said adjusting steps; and
commencing flow of said second reactant after said placing step.

31. The method of claim 29, wherein the second of said adjusting steps comprise opening said run valve and closing said inerting valve.

32. The method of claim 2, wherein said step of configuring said system comprises the additional step of fluidly coupling a pressure source to said source of said second reactant.

33. A method of purging a fuel cell system, said method comprising:
configuring said system to include:
at least one fuel cell comprising an anode, a cathode and a membrane disposed between said anode and cathode;
an anode flowpath configured to couple said anode to a source of a first reactant;
a cathode flowpath configured to couple said cathode to a second reactant source;
a combustor in selective fluid communication with both of said flowpaths, said combustor possessive of such thermal mass that heat generated by a reaction process is substantially absorbed by said combustor, thereby keeping temperature increases concomitant with said reaction below a predetermined amount; and
a plurality of valves, at least one of which is configured to establish said selective fluid communication between said combustor and at least one of said flowpaths, said plurality of valves comprising:
an inerting valve configured to selectively introduce one of said first or second reactants into said combustor; and
a run valve configured to selectively introduce said first reactant into at least one of said combustor or said anode;
adjusting at least one of said inerting valve or said run valve to obtain a substantially stoichiometric mixture of said first and second reactants in said combustor;
reacting said substantially stoichiometric mixture such that a substantially inert fluid is produced;
introducing said substantially inert fluid into at least one of said anode or cathode such that any fluid previously resident therein is substantially displaced therefrom; and
adjusting at least one of said inerting valve or said run valve to stabilize said system.

* * * * *